(12) United States Patent
Biss et al.

(10) Patent No.: US 6,365,691 B1
(45) Date of Patent: Apr. 2, 2002

(54) CONTINUOUS, SOLVENT-FREE PROCESS FOR MAKING TERPOLYMERS OF MALEIC ANHYDRIDE, $C_{1-4}$ ALKYL VINYL ETHER AND ISOBUTYLENE

(75) Inventors: Russell Biss, Wayne; Jeffrey Cohen, Fair Lawn; John Zamora, Paramus; Krystyna Plochocka, Scotch Plains; Jeffrey A. Lynn, West Milford, all of NJ (US)

(73) Assignee: ISP Investments Inc., Wilmington, DE (US)

( * ) Notice: Subject to any disclaimer, the term of this patent is extended or adjusted under 35 U.S.C. 154(b) by 0 days.

(21) Appl. No.: 09/611,088

(22) Filed: Jul. 6, 2000

(51) Int. Cl.[7] ............................................. C08F 222/04

(52) U.S. Cl. ....................... 526/272; 526/266; 526/269; 526/270; 526/271; 526/332; 526/348.7

(58) Field of Search ................................. 526/266, 269, 526/270, 271, 272, 332, 348.7

(56) References Cited

U.S. PATENT DOCUMENTS 5,939,506 A * 8/1999 Plochocka .................. 526/272

* cited by examiner

Primary Examiner—Helen L. Pezzuto
(74) Attorney, Agent, or Firm—Walter Katz; William J. Davis; Marilyn J. Maue

(57) ABSTRACT

A continuous, solvent-free process for obtaining solvent-free, fine white powders of high molecular weight alternating terpolymers of maleic anhydride, a $C_1$–$C_4$ alkyl vinyl ether and isobutylene, without odor or taste.

8 Claims, 1 Drawing Sheet

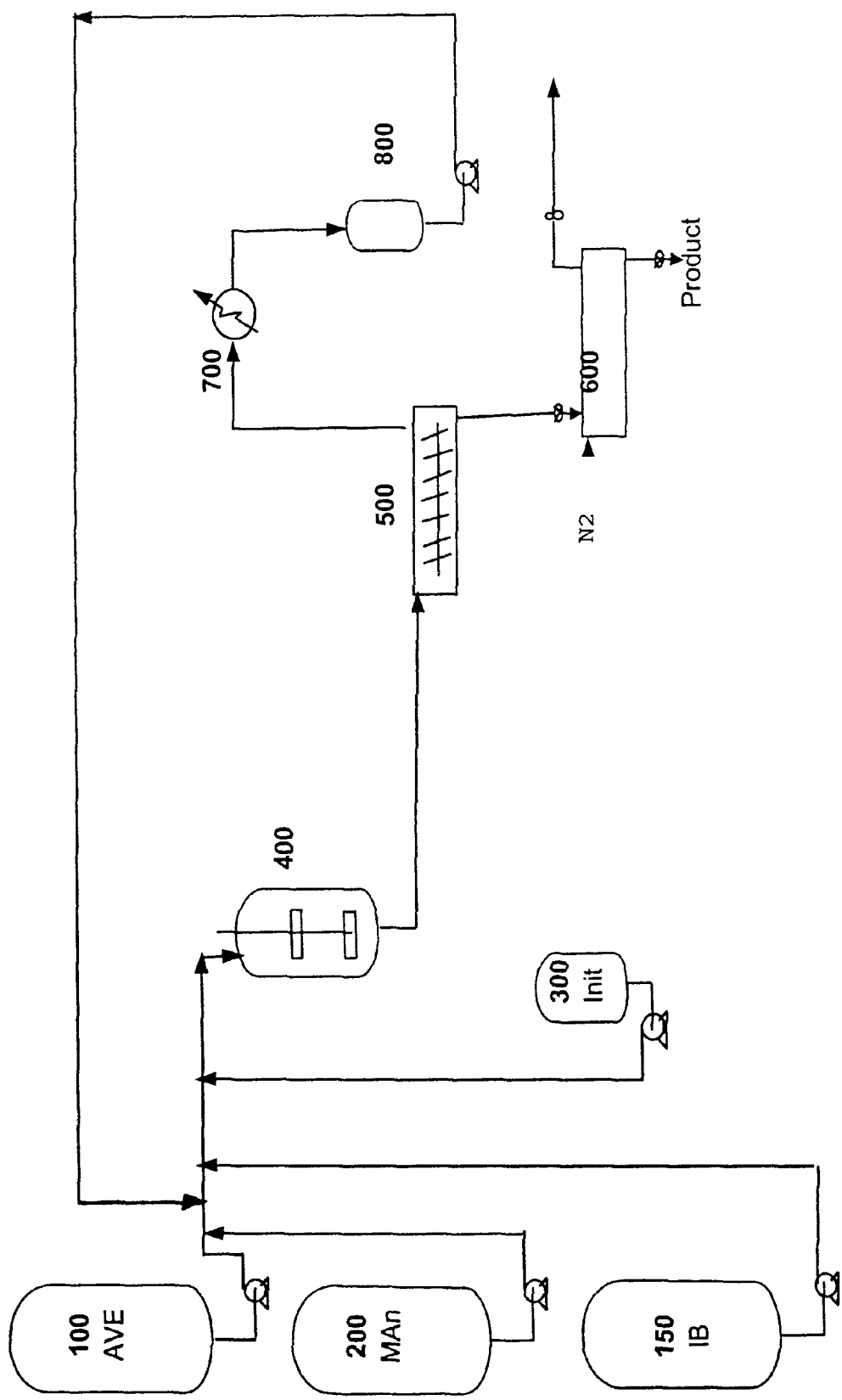

CONTINUOUS, SOLVENT-FREE PROCESS FOR MAKING TERPOLYMERS OF MALEIC ANHYDRIDE, $C_{1-4}$ ALKYL VINYL ETHER AND ISOBUTYLENE

DESCRIPTION OF RELATED U.S. PATENTS

This invention is related to U.S. Pat. Nos. 5,959,053 and 5,939,506, and U.S. patent application Ser. No. 09/596,297, filed Jun. 15, 2000 and assigned to the same assignee as herein.

BACKGROUND OF THE INVENTION

1. Field of the Invention

This invention relates to terpolymers of maleic anhydride, a $C_1$–$C_4$ alkyl vinyl ether and isobutylene, and, more particularly, to a continuous, solvent-free process for making solvent-free, fine white powders of such terpolymers having advantageous properties useful for oral care compositions.

2. Description of the Prior Art

A batch, solvent-free process (i.e. no solvent other than reactants themselves) for making fine powders of high molecular alternating terpolymers of maleic anhydride (MAN), a $C_1$–$C_4$ alkyl vinyl ether (AVE) and isobutylene (IB) is described in U.S. Pat. Nos. 5,959,053 and 5,939,506. In such process, excess AVE and IB monomers are present over a 1:1 molar ratio of monomers, to function both as reactant and solvent in the system. No other solvent is present in the reactor. Accordingly, after stripping the excess AVE and IB from the reaction product, a solvent-free terpolymer is obtained. However, a batch process requires an extended amount of time to effect the reaction, usually necessitating about 9–13 hours to complete each batch.

Accordingly, it is an object of this invention to provide a continuous, solvent-free process for making solvent-free, fine white powders of terpolymers of MAN, AVE and IB having advantageous properties useful for oral care compositions.

SUMMARY OF THE INVENTION

What is described herein is a continuous, solvent-free process for obtaining solvent-free, fine white powders of high molecular weight alternating terpolymers of maleic anhydride (MAN), a $C_1$–$C_4$ alkyl vinyl ether (AVE) and isobutylene (IB), without odor or taste, having the molecular structure (A-B)n, where A is MAN, B is AVE or IB, and n is an integer indicative of the molecular weight of the terpolymer preferably containing 5 to 45 mole % of IB.

The process herein comprises feeding continuously alkyl vinyl ether and isobutylene as monomer reactants and solvent in excess of the desired 1:1 mole ratio of A:B in the copolymer, molten maleic anhydride and a free radical initiator, at predetermined feeding rates, into a reactor heated at a reaction temperature of about 50 to 100° C., holding the reactants in the reactor for a predetermined average residence time, continuously withdrawing reaction product, residual alkyl vinyl ether and IB and initiator at the same rate as the feed rate of reactants into the reactor, stripping residual alkyl vinyl ether and isobutylene from the reaction product, drying the terpolymer obtained of any remaining traces of alkyl vinyl ether and isobutylene, and recycling recovered alkyl vinyl ether and isobutylene back into reactor.

In the preferred embodiments of the continuous solvent-free process of the invention, the alkyl vinyl ether is methyl vinyl ether, the mole ratio of a total of IB and methyl vinyl ether to molten maleic anhydride is about 25:1 to 5:1, most preferably 12:1 to 7:1, the initiator concentration is 0.01 to 0.2% based on the weight of copolymer, and the % copolymer solids removed from the polymerization reactor is about 10 to 40%.

DETAILED DESCRIPTION OF THE INVENTION

Referring now to the FIGURE, which is a schematic drawing for making solvent-free copolymers of maleic anhydride (MAN), a $C_{1-4}$ alkyl vinyl ether (AVE) and isobutylene (IB) by a continuous, solvent-free process. The continuous solvent-free process of the invention consists of the solvent feed systems 100 and 150, the molten maleic anhydride feed system 200, the catalyst or initiator feed system 300, the reactor system 400, the product recovery and drier systems 500 and 600, and the solvent recovery system 700 and 800.

The residence time in the reactor system should be sufficient to completely react MAN, e.g. from 0.5 to 5 hours. To ensure complete reaction of MAN, higher temperature and/or initiator booster can be used at the end of reaction zone. The specific viscosity (SV) of the copolymer is controlled by adding a chain transfer agent, preferably acetaldehyde, to the AVE and IB, and/or by controlling the reaction temperature, and/or the amount of initiator.

In systems 100 and 150, the liquified solvent monomers (methyl vinyl ether and isobutylene) are pressurized and fed at a constant flow to the reactor system 400 which may consist of a Continuous Stirred Tank Reactor (CSTR) or of two or more CSTRs in series, or an agitated back mixed reactor, or a plug flow tubular reactor, which is maintained at a constant temperature between about 40° C. to 120° C., preferably 60–90° C. Molten maleic anhydride (MAN), in 200, also pressurized, is fed at a constant rate in the reactor and mixed well with the solvent monomers; where, with a constant addition of an initiator having a half-life of 2 to 10 hours, e.g. lauroyl or decanoyl peroxide (or any other radical initiator) from 300, can rapidly react to form a slurry of the desired solid product (10–40% by weight) in the excess of liquid solvent monomer. In this continuous process, the molar ratio of (AVE+IB)/MAN in the reactor is about 25:1 to 5:1, preferably about 12:1 to 7:1.

With the maintenance of a constant volume in the reactor, the slurry mixture is continually withdrawn and fed to a low pressure drier system 500; where, with the addition of heat, the excess solvent monomer is vaporized and the solid product is separated and removed. The recovered monomer is then cooled and re-pressurized in the recovery system 800. Following compositional adjustments, the monomer solvents are returned to the reactor system 400.

AVE and IB may be separated from polymer by continuous drying or by filtration, and recycled after continuous purification e.g. by continuous distillation, washing with water of pH>9, and drying.

While the invention has been described with particular reference to certain embodiments thereof, it will be understood that changes and modifications may be made which are within the skill of the art. Accordingly, it is intended to be bound only by the following claims, in which.

What is claimed is:

1. A continuous, solvent-free process for obtaining solvent-free, fine white powders of high molecular weight alternating terpolymers of maleic anhydride, a $C_1$–$C_4$ alkyl vinyl ether and isobutylene, without odor or taste, having the molecular structure (A-B)$_n$, where A is maleic anhydride, B is an alkyl vinyl ether or isobutylene, and n is an integer indicative of the molecular weight of the copolymer, which comprises feeding alkyl vinyl ether and isobutylene as reactants and solvents in excess over the desired 1:1 mole ratio of A:B in the copolymer, molten maleic anhydride and a free radical initiator, continuously and at predetermined feeding rates into a reactor heated at a reaction temperature of about 50° to 100° C., holding the reactants in the reactor for a predetermined average residence time, withdrawing reaction product, residual alkyl vinyl ether, isobutylene and initiator at the same rate as the feed rate of reactants into the reactor, stripping residual alkyl vinyl ether and isobutylene from the reaction product, drying the terpolymer obtained of any remaining traces of alkyl vinyl ether, and recycling recovered alkyl vinyl ether and isobutylene back into reactor as reactants and solvents.

2. A continuous, solvent-free process according to claim 1 wherein said terpolymer and alkyl vinyl ether is methyl vinyl ether contains 5 to 45 mole % isobutylene.

3. A continuous, solvent-free process according to claim 1 wherein the mole ratio of alkyl vinyl ether and isobutylene to molten maleic anhydride is about 25:1 to 5:1.

4. A continuous, solvent-free process according to claim 3 wherein said mole ratio is 12:1 to 7:1.

5. A continuous, solvent-free process according to claim 1 wherein the initiator concentration is 0.01 to 0.2% based on copolymer.

6. A continuous, solvent-free process according to claim 1 wherein the % copolymer solids removed from the polymerization reactor is about 10 to 40%.

7. A continuous, solvent-free process according to claim 1 wherein the drying step is carried out at 400 to 100° C. under vacuum or atmospheric pressure.

8. A continuous, solvent-free process according to claim 1 wherein the residence time in the reactor is about 0.5 to 5 hours.

* * * * *

UNITED STATES PATENT AND TRADEMARK OFFICE
CERTIFICATE OF CORRECTION

PATENT NO. : 6,365,691 B1
DATED : April 2, 2002
INVENTOR(S) : Biss et al.

It is certified that error appears in the above-identified patent and that said Letters Patent is hereby corrected as shown below:

<u>Title page,</u>
Item [*] Notice, delete the phrase "by 0 days" and insert -- by 46 days --

Signed and Sealed this

Twenty-first Day of September, 2004

JON W. DUDAS
*Director of the United States Patent and Trademark Office*